(12) United States Patent
Wakitani et al.

(10) Patent No.: US 7,015,662 B2
(45) Date of Patent: Mar. 21, 2006

(54) ENGINE OPERATED MACHINE

(75) Inventors: Tsutomu Wakitani, Saitama (JP);
Toshiaki Kawakami, Saitama (JP);
Toshinori Inagawa, Saitama (JP);
Yoshihisa Shinogi, Saitama (JP)

(73) Assignee: Honda Motor Co. Ltd., Tokyo (JP)

( * ) Notice: Subject to any disclaimer, the term of this patent is extended or adjusted under 35 U.S.C. 154(b) by 71 days.

(21) Appl. No.: 10/778,546

(22) Filed: Feb. 17, 2004

(65) Prior Publication Data

US 2004/0169481 A1    Sep. 2, 2004

(30) Foreign Application Priority Data

Feb. 28, 2003  (JP)  ............... 2003-054346

(51) Int. Cl.
*H02P 5/22* (2006.01)

(52) U.S. Cl. .................. 318/143; 318/146; 318/147

(58) Field of Classification Search ............... 318/376, 318/432, 140–146; 37/242; 322/24; 290/31; 180/65.2, 65.3; 701/22; 320/124
See application file for complete search history.

(56) References Cited

U.S. PATENT DOCUMENTS

| 3,786,696 | A  | * | 1/1974  | Aleem .................... 475/77 |
| 5,722,911 | A  | * | 3/1998  | Ibaraki et al. ............. 477/3 |
| 6,260,644 | B1 | * | 7/2001  | Otsu .................... 180/65.3 |
| 6,409,623 | B1 | * | 6/2002  | Hoshiya et al. ............. 475/5 |
| 6,694,232 | B1 | * | 2/2004  | Saito et al. ............... 701/22 |
| 6,734,647 | B1 | * | 5/2004  | Wakitani et al. ........... 318/432 |
| 6,752,226 | B1 | * | 6/2004  | Naito et al. ............. 180/65.3 |
| 6,766,874 | B1 | * | 7/2004  | Naito et al. ............. 180/65.3 |
| 6,840,203 | B1 | * | 1/2005  | Wakitani et al. .......... 123/179.3 |
| 2002/0007975 | A1 | * | 1/2002 | Naito et al. ............. 180/65.3 |
| 2002/0101217 | A1 | * | 8/2002 | Hosoda et al. ............. 320/124 |
| 2003/0078707 | A1 | * | 4/2003 | Shioda et al. ............... 701/22 |
| 2003/0173123 | A1 | * | 9/2003 | Nakanowatari ............ 180/65.2 |
| 2004/0000882 | A1 | * | 1/2004 | Wakitani et al. ............. 318/66 |
| 2004/0168840 | A1 | * | 9/2004 | Kuang et al. ............. 180/65.2 |
| 2004/0222757 | A1 | * | 11/2004 | Inui et al. ................ 318/146 |
| 2004/0227348 | A1 | * | 11/2004 | Wakitani et al. ............. 290/31 |
| 2004/0244346 | A1 | * | 12/2004 | Inui et al. ................ 56/11.9 |
| 2005/0057226 | A1 | * | 3/2005 | Kawakami et al. ........... 322/24 |
| 2005/0097785 | A1 | * | 5/2005 | Wakitani et al. ............. 37/242 |

FOREIGN PATENT DOCUMENTS

JP    2001-161114    6/2001

* cited by examiner

*Primary Examiner*—Paul Ip
(74) *Attorney, Agent, or Firm*—Westerman, Hattori, Daniels & Adrian, LLP

(57) ABSTRACT

The invention makes an output sharing of an engine and an electric motor proper so as to suitably drive a load. When a throttle opening degree variation amount $\Delta V$ is within a $\Delta V1$, an engine E can drive a power generator G at a rated revolution speed. A switching circuit 28 is switched in such a manner as to charge a battery 27 by a generated power. When the opening degree variation amount $\Delta V$ becomes larger than the $\Delta V1$, a power assist of operating the power generator G as the electric motor is set to be standby. When the opening degree variation amount $\Delta V$ is more than $\Delta V2$ ($>\Delta V1$), the power assist is started. In the power assist, an angle advance amount is increased. When acceleration is insufficient, it is possible to further increase a conduction angle in stages.

6 Claims, 6 Drawing Sheets

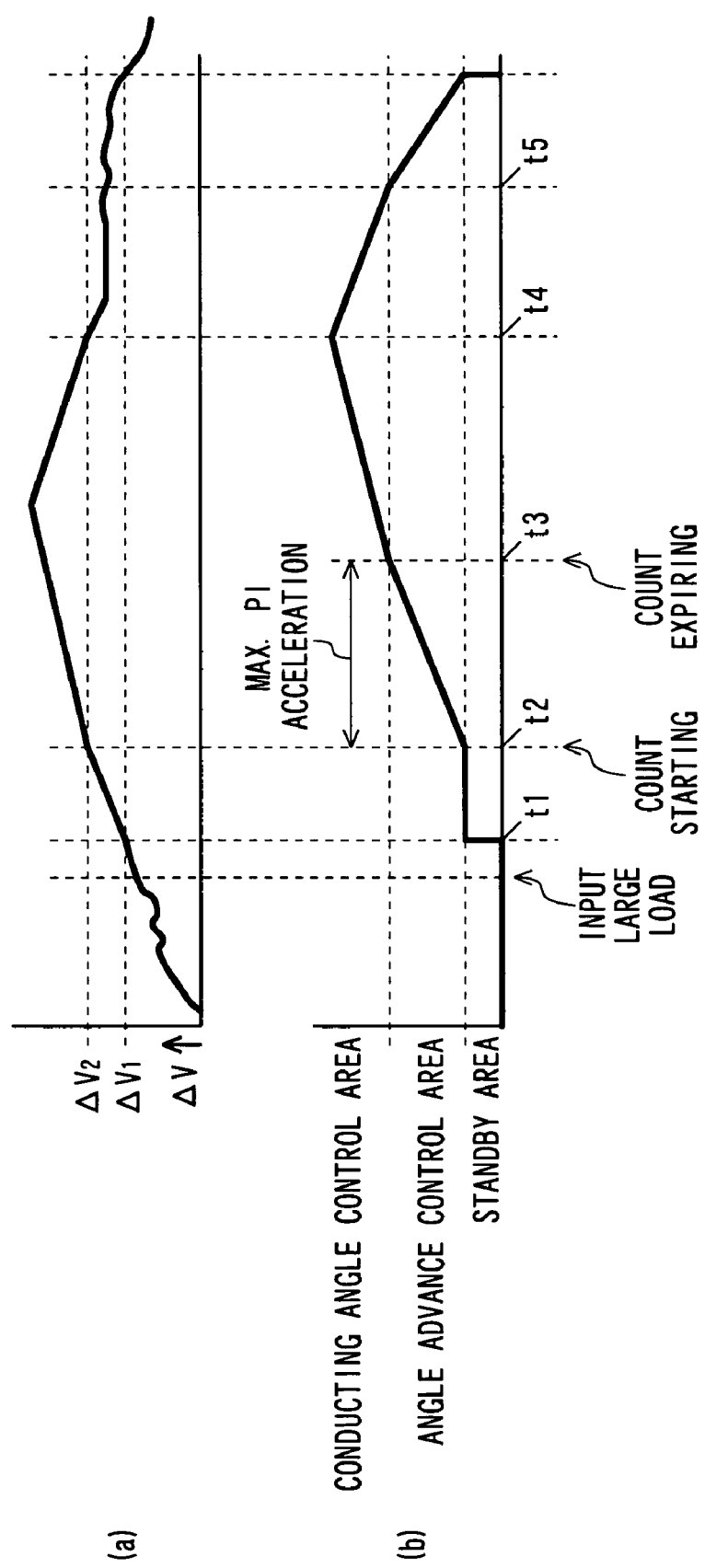

ENGINE OPERATED MACHINE

BACKGROUND OF THE INVENTION

1. Field of the Invention

The present invention relates to an engine operated machine, and more particular to an engine operated machine in which an electric motor that is also operated as a power generator is connected to an output shaft of an engine.

2. Description of the Related Art

An agricultural working machine, called as a hybrid powered engine operated machine structured such that both an engine power and an electric motor power can be used has been known. For example, in Japanese Patent Application Laid-Open No. 2001-161114, there is proposed an engine drive passenger farming machine in which in the case that a load of the farming machine is small, a surplus energy that is generated by an engine driven generator is accumulated, and in the case that the load is large, an electric motor is driven by the electric power. In the passenger farming machine, it is judged that the load is large, in the case that an exhaust temperature of the engine becomes equal to or more than a predetermined value.

In the passenger farming machine described in the publication mentioned above, the electric motor output is combined with the engine output, whereby a large driving force can be obtained. However, since it is judged based on the exhaust temperature that the large driving force is actually required, it is hard to execute such an operation as to supplement only a necessary driving force in correspondence to a rapid load change.

SUMMARY OF THE INVENTION

An object of the present invention is to provide an engine operated machine which can suitably change a driving force in correspondence to a rapid load change.

In order to achieve the object mentioned above, according to a first aspect of the present invention, there is provided an engine operated machine comprising: an engine that drives the working machine with approximately at a constant speed; and an electric motor that is also operated as a power generator having an output shaft connected with an output shaft of the engine, wherein the engine operated machine changes a mode between a charging mode where a battery is charged by operating the electric motor as a power generator in correspondence to a variation of a revolution speed of the engine, and a driving mode where a power of the engine is increased by a power supplied with the battery as a power source.

According to the first aspect, it is determined which of the power generator and the electric motor is operated by in correspondence to the variation of the load represented by the engine speed, and the power generator and the electric motor is operated alternately. Accordingly, it is possible to share the output in correspondence to the load, and it is possible to drive the engine load based on the stable engine revolution speed.

Further, according to a second aspect of the present invention, the engine operated machine is structured such that the charging mode is stopped in a first region in which the variation of the engine revolution speed is more than a predetermined normal range, and the working machine is operated according to the driving mode in a second region in which the variation of the engine revolution is larger than that in the first region.

According to the second aspect, in the first region, since the electric motor is in an idling state in which the electric motor functions neither as a power generator nor an electric motor, all of the engine output can be supplied to the load in this first region. Further, by providing this first area, it is possible to inhibit the electric motor from being frequently changed between a power generator operation and an electric motor operation.

Further, according to a third aspect of the present invention, a feedback control is executed in the driving mode by making a revolution speed target of the electric motor higher than a revolution speed target of the engine, and when the electric motor does not reach the engine revolution speed target within a predetermined time from starting of the driving mode, an output torque of the electric motor is increased according to a current supplying control.

According to the third aspect, in the case that it takes for the engine revolution speed to reach the revolution speed target, it is possible to apply a suitable assisting power.

Further, according to a fourth aspect of the present invention, the engine operated machine is structured such that the engine is controlled by a governor so as to be operated approximately at a constant speed, and the variation of the revolution speed is judged based on a variation of an opening degree of the governor.

According to the fourth aspect, the power assist can be achieved by forecasting the variation of the engine revolution speed based on the operation of the governor in correspondence to the variation of the engine revolution speed.

BRIEF DESCRIPTION OF THE DRAWINGS

FIG. 8 is a timing chart of a power assist; and

DETAILED DESCRIPTION OF THE PREFERRED EMBODIMENTS

Figure 2:
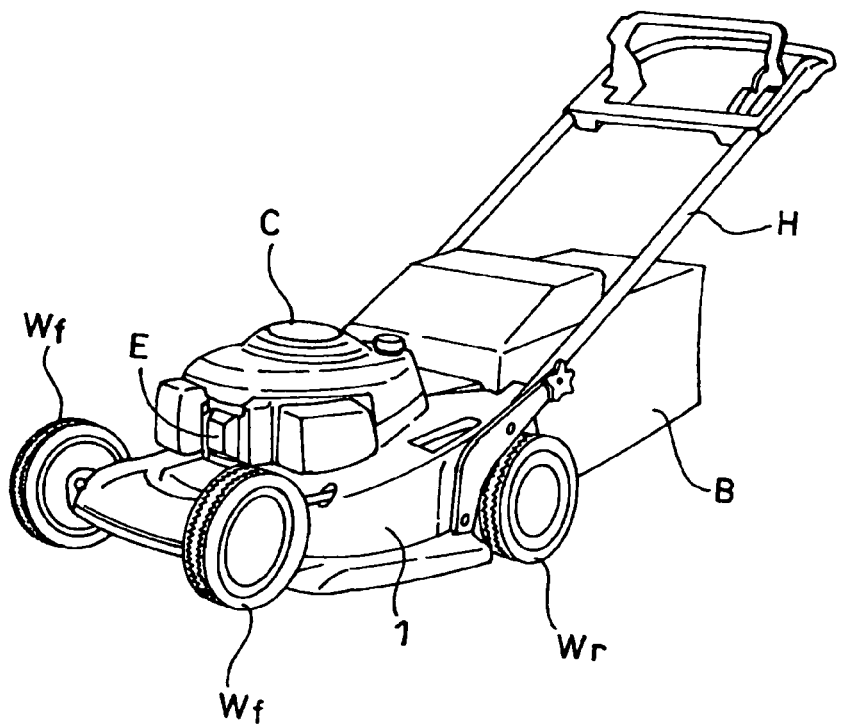
FIG. 2 is a perspective view of a lawn mower according to an embodiment of the present invention.
Figure 3:
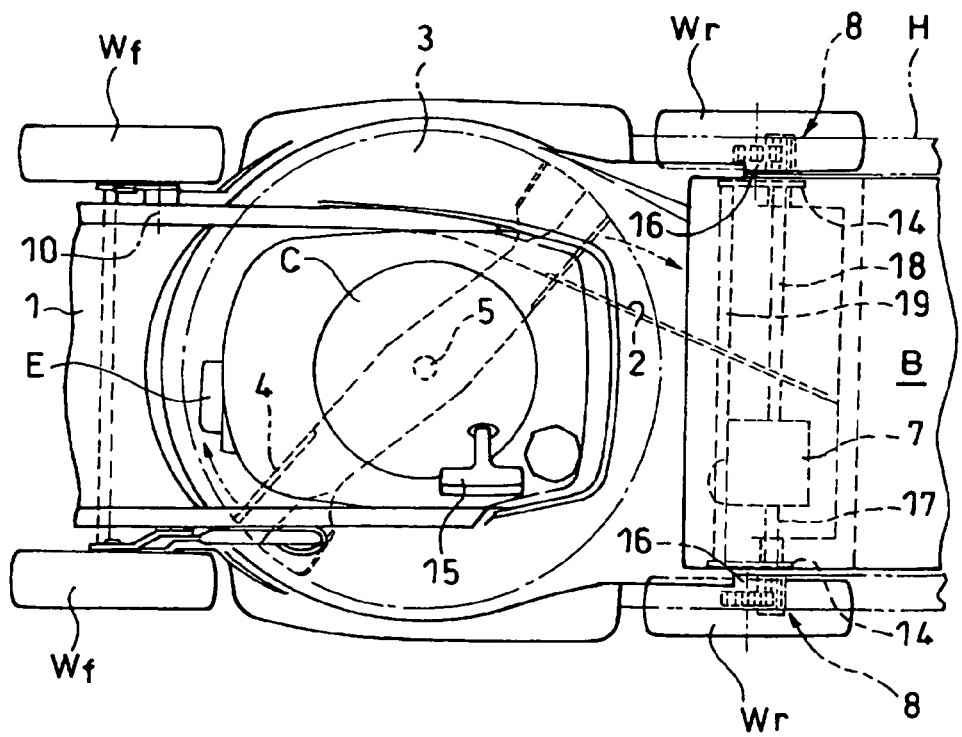
FIG. 3 is a plan view of a main portion of a lawn mower according to an embodiment of the present invention.

A description will be given in detail below of an embodiment according to the present invention with reference to the accompanying drawings. FIG. 2 is a perspective view of an entire of a lawn mower corresponding to an engine operated machine according to an embodiment of the present invention, and FIG. 3 is a plan view of a main portion of the lawn mower. In FIG. 2, a pair of front wheels Wf and Wf is suspended to a front portion of a cutter housing 1 in the lawn mower, and a pair of rear wheels Wr and Wr is suspended to a rear portion of the cutter housing. An engine E in which an output shaft or a crankshaft is vertically provided is mounted in a center portion of the cutter housing 1, and an engine cover C is put on an upper protruding portion of the engine E. An operation handle H extending so as to rearward ascend toward a rear side is provided in both sides of a rear portion of the cutter housing 1, and a grass bag B for receiving mown lawn grasses is provided in the rear portion of the cutter housing 1.

In FIG. 3, a hollow cylindrical cutter chamber 3 that is open in a lower surface, that is, a ground surface side is formed in a center portion of the cutter housing 1, and a blade cutter (a working machine main body) 4 is received in the cutter chamber 3. The blade cutter 4 is connected with a crankshaft 5 of the engine E via a clutch (not shown), and is driven by the engine so as to rotate within the cutter chamber 3. A rotor of a power generator that is operated as a starter electric motor as well as a power generator mentioned below is connected with an upper end portion of the crankshaft 5 opposite to the other end portion with which the blade cutter 4 is connected.

A lawn grass discharging port 2 extending rearward from an outlet of the cutter chamber 3 and communicating with the grass bag B (refer to FIG. 2) is formed in a right side of the cutter housing 1 in a forward moving direction. The lawn grasses mowed by the blade cutter 4 are collected in the grass bag B through the lawn grass discharging port 2.

Rear wheel supporting members 14, 14 are respectively arranged in both right and left sides of the rear portion of the cutter housing 1, and axles 16, 16 of the rear wheels Wr and Wr are suspended to the supporting members 14, 14. The right and left supporting members 14, 14 are connected to each other by a connecting shaft 19, and output shafts 17, 18 are provided in parallel to the connecting shaft 19. One ends of the output shafts 17 and 18 are connected to an electric motor 7, another ends of the output shafts 17 and 18 extend respectively to the supporting members 14, 14 and are connected to the axles 16, 16 of the rear wheels Wr and Wr via a reduction gear mechanism 8.

A recoil starter starting the engine E by using a starter rope is received within the engine cover C covering an upper portion of the engine E. A starter grip 15 connected with the starter rope (not shown) of the recoil starter is held in the engine cover C.

Figure 4:
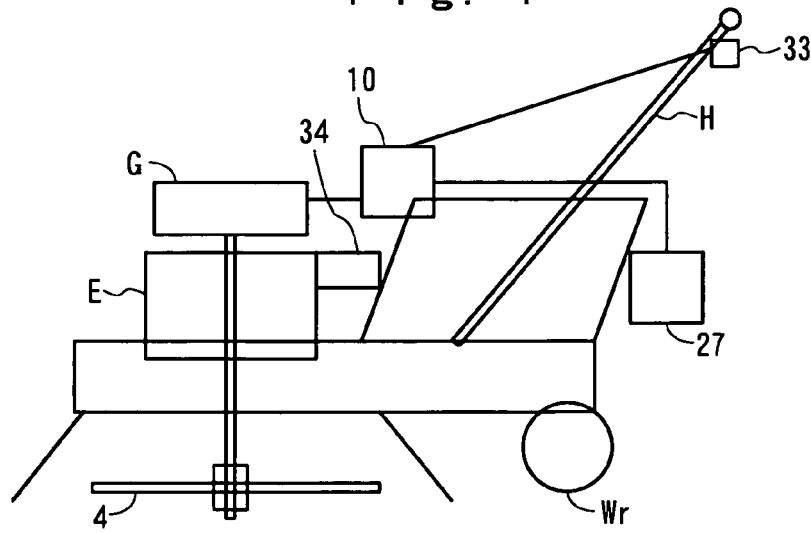
FIG. 4 is a block diagram showing an entire system of the lawn mower.

FIG. 4 is a block diagram showing an entire system of the lawn mower mentioned above. In the drawing, a power generator G is connected with the engine E. The power generator G is constituted, for example, by an outer rotor type three-phase alternating current power generator and does double duty as a starter electric motor. A control circuit 10 is connected with the power generator G, and a battery 27 is connected with the control circuit 10. The control circuit 10 is provided with a rectifying circuit and a regulator mentioned below. When the power generator G is operated as the starter electric motor, an electric power is supplied to the power generator G from the battery 27 via the control circuit 10. On the other hand, a generated output of the power generator G is connected with the battery 27 via the control circuit 10 to charge the battery 27.

An engine operation switch 33 for giving start and stop instructions of the engine E is connected with the control circuit 10. The engine operation switch 33 is provided in an upper portion of the operation handle H. The electric motor 7 driving the rear wheel Wr is controlled so as to maintain the revolution speed target by a drive circuit (not shown) to which the electric power is supplied from the battery 27.

A governor 34 is provided for controlling the engine revolution speed to the revolution speed target (a rated engine revolution speed). The governor 34 includes a means for detecting the engine revolution speed, for example, based on an ignition pulse interval or an ignition pulse number of the engine, and an actuator means such as a step electric motor or the like for controlling a throttle opening degree in correspondence to a difference between the detected engine revolution speed and the engine revolution speed target, and a sensor means for detecting a varied amount of the throttle opening degree.

Figure 5:
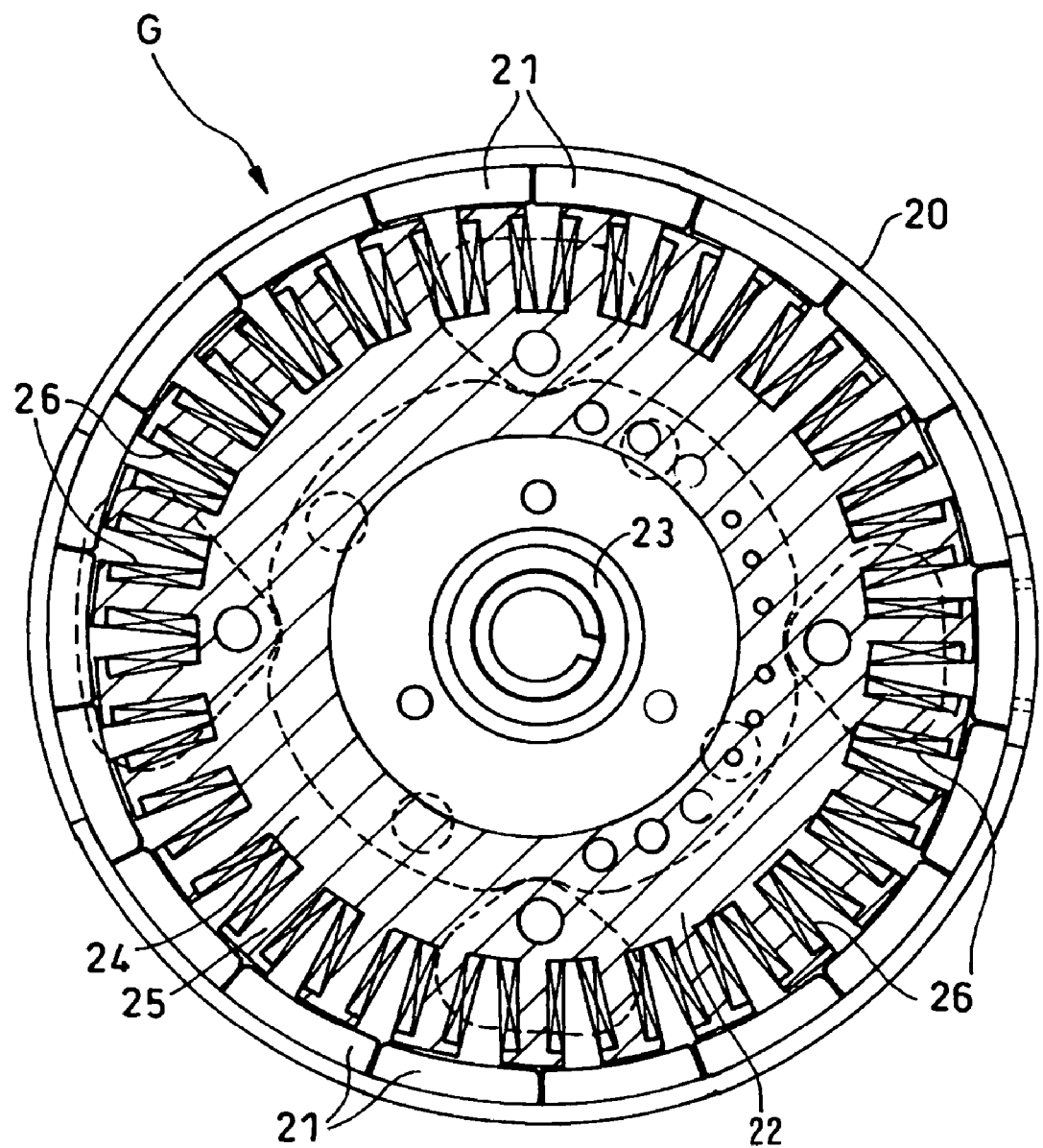
FIG. 5 is an exploded front elevational view showing an example of a power generator.

FIG. 5 is an exploded front elevational view of the power generator G. The power generator G is provided with a flywheel rotor 20 formed in a basin shape or bottomed cylinder, eighteen permanent magnets 21 arranged in an inner peripheral surface of the rotor 20, and a stator 22 arranged in the inner periphery of the rotor 20 so as to oppose to the magnets 21. The rotor 20 is provided with a sleeve 23 connected with the crankshaft 5 of the engine E. The magnets 21 are structured such that north poles and south poles are polarized in an outer peripheral side and an inner peripheral side, and different polarities are opposed to each other in the adjacent respective magnets 21. A stator core 24 of the stator 22 extends radially, and is provided with twenty-seven salient poles 25 arranged so as to oppose to the inner peripheral side surface of the magnet 21. A coil winding 26 is wound around each of the salient poles 25.

The power generator G is driven according to a sensorless control having no sensor for detecting a position of the rotor magnetic pole. Accordingly, the position of the rotor magnetic pole is detected based on a back electromotive voltage induced by the coil winding in each of the phases during the rotation of the rotor 20, and the position of the rotor magnetic pole is estimated based on a relative current in each of the phases of the power generator G at a time of starting. For example, the position of the magnetic pole is estimated based on a ratio of the currents respectively flowing through a U phase and a W phase. This starting method is known as a "vector control". In this case, the structure may be made such that the control is executed based on the detected signals of all the sensors from the starting time to the operating time, by arranging a magnetic sensor or the like for detecting the position of the rotor magnetic pole.

Figure 6:
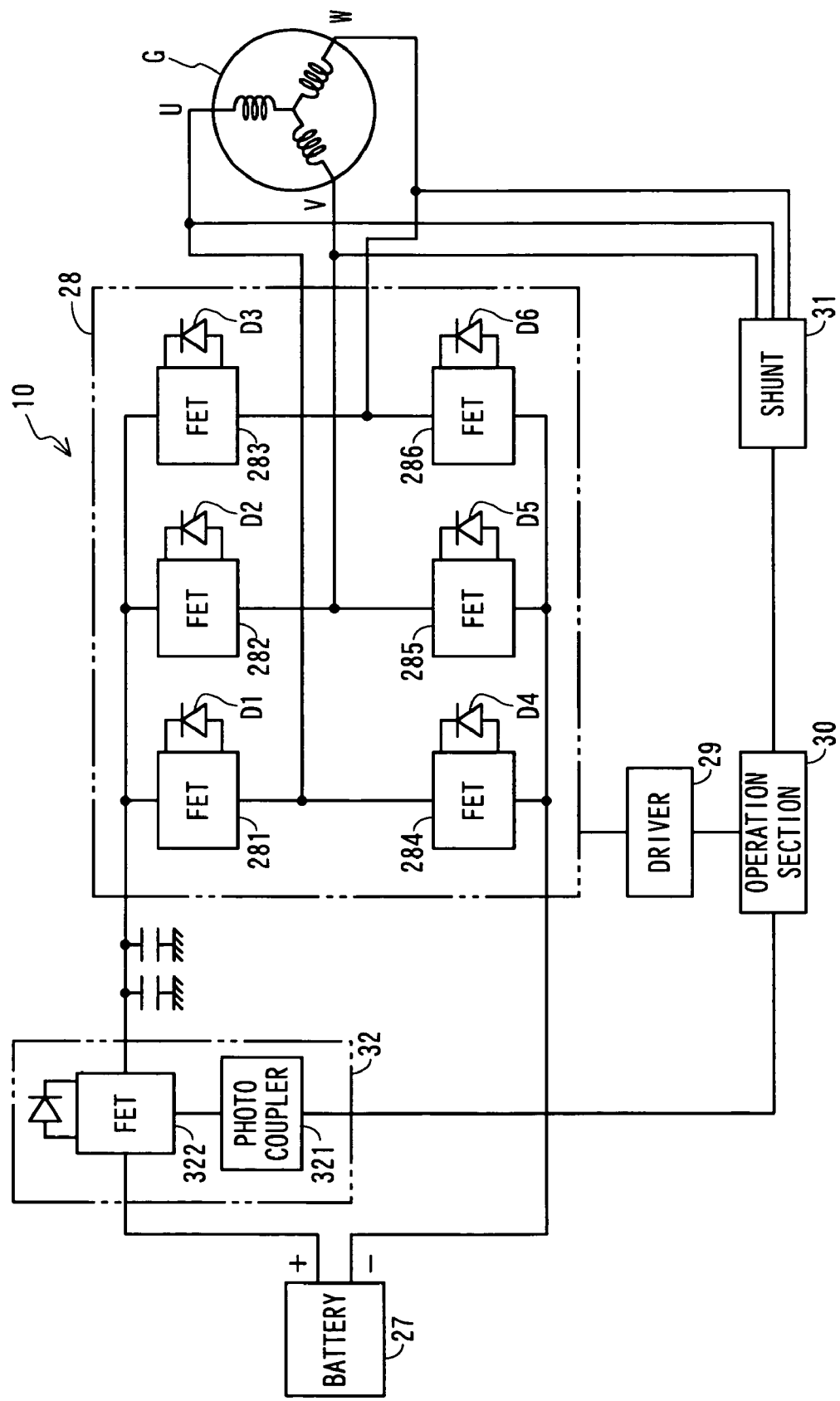
FIG. 6 is a circuit diagram showing an example of a control circuit.

FIG. 6 is a circuit view showing an example of the control circuit 10. The control circuit 10 has a switching circuit 28. The switching circuit 28 includes six MOSFET, that is, metal oxide semiconductor field-effects transistors (hereinafter, refer simply to "FET") 281 to 286. The FETs 281 to 283 are arranged in an upper array, and the FETs 284 to 286 are arranged in a lower array. Fly-back diodes D1, D2, D3, D4, D5 and D6 are respectively connected to the FETs 281 to 286 in parallel. A driver 29 for applying a driving voltage is provided in gates of the FETs 281 to 286.

The driver 29 sequentially applies the driving voltage to the gates of the FETs 281 to 286 in the case of using the power generator G as the starter electric motor. An operation section 30 which can be constituted by DSP (Digital Signal Processor) has a function of determining a cycle generating the driving voltage, that is, a changing cycle of the FETs 281 to 286 so as to output to the driver 29. The operation section 30 further has a function of detecting a current waveform based on the current of the power generator G detected via a shunt 31.

At a time of charging the battery 27 by the generated output of the power generator G, the driver 29 cut off the driving electricity and turns off all the FETs 281 to 286. Accordingly, the generated current of the power generator G is rectified by the fly-back diodes D1 to D6 so as to be supplied to the battery 27. The control circuit 10 has a regulator circuit 32 for setting the voltage of the battery 27 to a predetermined value. A photo coupler 321 constitutes the regulator circuit 32 and an FET 322. The FET 322 is on-off controlled in response to opening and closing of the photo coupler 321, the electric power from the power generator G supplied to the battery 27 is controlled according to an on time of the FET 322. The operation section 30 shortens the on time of the FET 322 when a regulator output indicated value is higher than the predetermined value, and lengthens the on time of the FET 322 when the battery voltage is lower than the predetermined value, thereby controlling so as to change the charged power.

Figure 7:
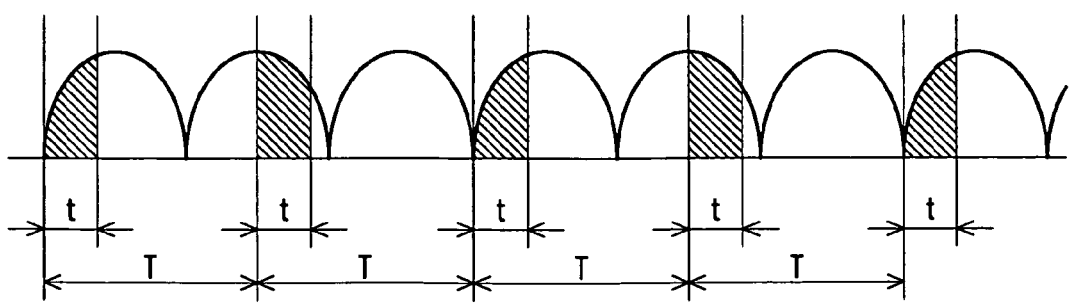
FIG. 7 is a schematic view of a control method of an FET.

FIG. 7 is a view of a waveform after rectifying the output of the power generator and shows a switching control method of the FET 322 for keeping the battery voltage to the predetermined value. The FET 322 is on operated for a defined time t within an optionally set constant period T, in the output of the rectified power generator G. Varying a rate of the on-operation time t, that is, the on time t in the cycle T, regulates the electric power supplied to the battery 27. In this case, the on-operation time t is not limited to that per an optional cycle. For example, the structure may be made such as to detect a zero-cross of the output of the power generator and turn on the FET 322 for a time t from a timing of the zero-cross.

FIG. 8 is a timing chart of a power assist where the power generator G is driven as the electric motor in correspondence to the rotational state of the engine. FIG. 8A shows a changing state of the engine revolution speed according to the throttle opening degree of the governor 34 as a throttle opening degree variation amount (hereinafter, refer simply to "opening degree variation amount"), and FIG. 8B shows a variation of a control amount.

The engine drive power generator mounted on the lawn mower mentioned above is operated so as to keep the engine at the rated revolution speed by controlling an opening degree variation amount $\Delta V$ within a first amount $\Delta V1$ when the engine revolution speed is varied. Accordingly, the engine revolution speed variation amount at a time when the large load is input can be represented by the opening degree variation amount.

In other words, when the large load is input, the opening degree variation amount $\Delta V$ becomes large in correspondence thereto. At a time point t1 at which the opening degree variation amount $\Delta V$ is more than the amount $\Delta V1$, the rated revolution speed of the engine cannot be maintained based on the throttle adjustment by means of the governor 34. Accordingly, the power assist is set to an allowable state by changing to the electric motor driving mode.

At a time point t2 at which the opening degree variation amount $\Delta V$ is more than a second amount $\Delta V2$, the output of the electric motor is intended to be increased by increasing an amount of an electrical angle advancing. Further, in the case that the engine revolution is not reached the revolution speed target even after a predetermined time has passed from the time point at which the opening degree variation amount $\Delta V$ is more than the second amount $\Delta V2$, and the opening degree variation amount $\Delta V$ is still more than the second amount $\Delta V2$, it can be determined that the load increase carries on. In this case, it is intended to increase the output torque according to the increase of the current supply period or conducting angle in addition to the electrical angle advancing control at a timing t3. Further, at a time point t4 at which the opening degree variation amount $\Delta V$ becomes within the second amount $\Delta V2$, a reduction of the conducting angle is started. When the conducting angle returns to a basic electrical angle (120 degree), the amount of the electrical angle advancing is reduced from a time point t5.

Figure 9:
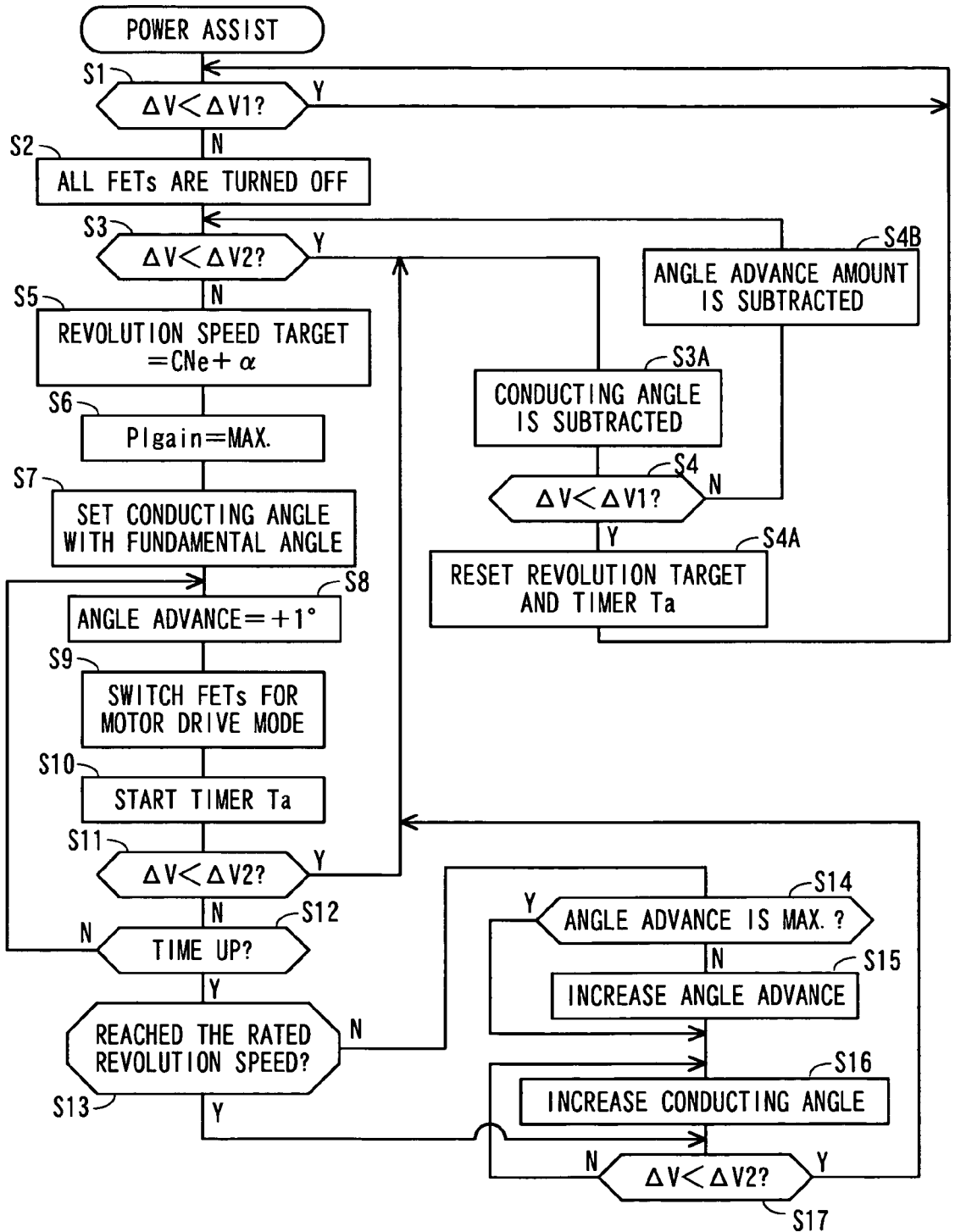
FIG. 9 is a flow chart showing a main process of the power assist.

FIG. 9 is a flow chart showing a main process of the power assist. The process shown in the drawing is started in a state in which the power assist is off. In a step S1, it is judged whether the opening degree variation amount $\Delta V$ is less than the first amount $\Delta V1$ or not, that is, whether the amount $\Delta V$ is belonging to the first region of the opening degree variation amount or not at a time of the rated revolution. The power assist is maintained off during a period that the opening degree variation amount $\Delta V$ is smaller than the first amount $\Delta V1$. If it is judged that the opening degree variation amount $\Delta V$ becomes larger than the first amount $\Delta V1$, the step goes to a step S2, the mode is changed to the electric motor driving mode as a preliminary stage of the power assist, and all the FETs 281 to 286 are turned off. The power generator G becomes in a "free" state in which the power generator generates no power and generates no driving power as the electric motor, by turning off all the FETs 281 to 286. Accordingly, it is possible to supply the entire engine output to the load in this region.

In a step S3, it is judged whether or not the opening degree variation amount $\Delta V$ is further increased, based on a matter whether or not the opening degree variation amount $\Delta V$ is smaller than the second amount $\Delta V2$ larger than the first amount $\Delta V1$. If the step S3 is affirmative, the step goes to a step S3A. In the step S3A, the conducting angle of the power generator G is subtracted one step by one step (one step is an optional angle) so as to return the conducting angle of the power generator G to the basic conducting angle. In other words, the conducting angle is returned to the basic conducting angle step by step.

In a step S4, it is judged whether or not the opening degree variation amount $\Delta V$ becomes smaller than the first amount $\Delta V1$. If the step S4 is affirmative, that is, the opening degree variation amount $\Delta V$ is smaller than the second amount $\Delta V2$ and smaller than the first amount $\Delta V1$, the step goes to the step S1 via a step S4A. In the step S4A, the process resets the target revolution speed of the generator G as the electric motor and a timer Ta (mentioned below).

In the case that the opening degree variation amount $\Delta V$ is larger than the first amount $\Delta V1$, the step goes to a step S4B, and the electrical angle advance amount is subtracted one step by one step (one step means an optional angle) for the purpose of returning the electrical angle advance amount to an initial amount.

In the case that the step S3 is negative, that is, the opening degree variation amount $\Delta V$ is larger than the second amount $\Delta V2$, power assist is started. First, in a step S5, the revolution speed target is set as the electric motor to a value obtained by adding an acceleration value $\alpha$ to a rated speed CNe of the engine. The acceleration value $\alpha$ is set, for example, to 200 rpm. In a step S6, the process sets a gain (a feedback amount) of the PI control to a maximum value in such a manner that the power generator G can be operated as the electric motor in a rapid acceleration state. By setting the feedback amount to the maximum value, it is possible to speed up the rise of the electric motor so as to inhibit the electric motor itself from becoming the load of the engine.

In a step S7, setting the conducting angle with a fundamental conducting angle (120 degree). In a step S8, a conducting phase of the three-phase coil winding in the power generator G is advanced. The angle advance amount is increased step by step, for example, one degree by one degree, until the angle advance reaches a maximum advance angle 60 degree. In this case, the maximum angle advance amount can be optionally set without being limited to 60 degree. It is possible to accelerate so as to reach the target speed CNE+α earlier by increasing the angle advance amount.

When finishing setting the parameters for operating the power generator G as the electric motor, the step goes to a step S9, and the FETs 281 to 286 are switched according to the electric motor drive mode. Accordingly, the power generator G is operated as the electric motor. In a step S10, the timer Ta is started. A time when the electric motor revolution speed reaches the rated revolution speed CNe is judged based on the value of the timer Ta.

In a step S11, it is judged whether or not the opening degree variation amount ΔV is smaller than the second amount ΔV2. If the step S11 is affirmative, the step goes to the step S4. If the step S11 is negative, that is, it is judged that the opening degree variation amount ΔV is not smaller than the second amount ΔV2, the step goes to a step S12. In the step S12, it is judged whether or not the timer Ta is timed up. The step goes to the step S8 until the timer Ta is timed up, and if the timer Ta is timed up, the step goes to a step S13.

In the step S13, it is judged whether or not the engine revolution speed reaches the rated revolution speed CNe. If the engine revolution speed does not reach the rated revolution speed, it is judged that the power assist is not up with the increase of the load, and the step goes to a step S14. In the step S14, it is judged whether or not the angle advance reaches the maximum value 60 degree. If the angle advance has already reached the maximum value, the step goes to a step S16. If the angle advance does not reach the maximum value, it is possible to intend to increase the output by increasing the angle advance amount, so that the step goes to a step S15 and the process increases the angle advance amount to the maximum angle advance. Further, in the step S16, it is possible to intend to improve a torque by increasing the conducting angle. In other words, the process increases only the angle advance at the beginning so as to assist power, and after the angle advance reaches the predetermined maximum value (for example, 60 degree), the process assists the power by increasing the conducting angle in addition to the increase of the angle advance. The conducting angle has an increase width of ±30 degree with respect to the base conducting angle, and can be increased one degree by one degree to the maximum value in stages. The maximum value can be optionally set within a range of the increase width.

In a step S17, it is judged whether or not the opening degree variation amount ΔV is smaller than the second amount ΔV2. If the step S17 is affirmative, the step goes to the step S3A. Further, if the step S4 is affirmative, that is, the opening degree variation amount ΔV down below the first amount ΔV1, the power assist is cancelled by changing the mode from the electric motor driving mode to the power generator mode. If it is judged that the step S17 is negative, that is, the opening degree variation amount ΔV is not smaller than the second amount ΔV2, the step goes to the step S16.

Figure 1:
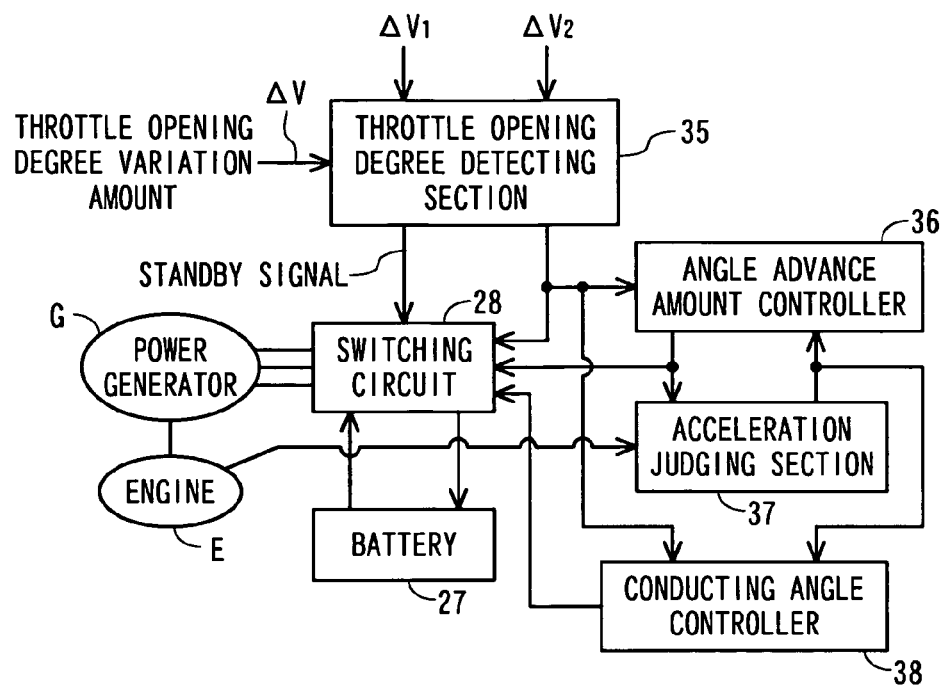
FIG. 1 is a block diagram showing a main function of a working machine according to an embodiment of the present invention.

FIG. 1 is a block diagram showing a main function for the power assist. In FIG. 1, a throttle opening degree detecting section 35 compares the opening degree variation amount ΔV with the first and second amount ΔV1 and ΔV2 (ΔV1<ΔV2) so as to judge a magnitude of the load. In the case that the opening degree variation amount ΔV is within the first amount ΔV1, the engine E is operated at the rated revolution speed, and drives the power generator G. The switching circuit 28 is switched in such a manner as to charge the battery 27 by the electricity generated at this time.

Further, when the opening degree variation amount ΔV becomes larger than the first range ΔV1, there is output a standby signal for preparing to change the power generator G to the electric motor driving mode of operating the power generator G as the electric motor. The switching circuit 28 is changed to the standby mode of not controlling the power generator G (turning off all the FETs 281 to 286) in response to the standby signal.

If the opening degree variation amount ΔV is more than the second range ΔV2, the power assist is started. In other words, the power generator G is driven as the electric motor by setting the target revolution speed of the feedback control as the electric motor to the engine rated speed CNe+α, and switching the switching circuit 28 at a normal or fundamental conducting angle. At the same time, the angle advance amount is increased by degrees by an angle advance amount controller 36. An acceleration judging section 37 judges a state of acceleration according to a matter whether or not the electric motor revolution speed reaches the rated revolution speed CNe at a predetermined time after the electric motor driving mode is started. The electric motor speed can be detected as the engine revolution speed by counting the ignition pulse of the engine. In the case that the acceleration state is delayed and the speed is not reached the revolution speed target within the predetermined time, the conducting angle controller 38 further increases the conducting angle by degrees.

In the case that the opening degree variation amount ΔV is returned within the second amount ΔV2 by increasing the angle advance amount or the conducting amount, the angle advance amount controller 36 and the conducting angle controller 38 returns the angle advance amount and the conducting amount to the normal values respectively.

According to the present embodiment, the necessity of the power assist is judged by the load state based on the variation amount of the throttle opening degree. However, the structure is not limited to this, for example, the necessity of the power assist can be judged based on an air flow rate, by detecting the air flow rate in an air intake of the engine by means of an air flow sensor. Further, the structure may be made such that the necessity of the power assist is judged by detecting an overload based on reduction or reduction amount of the engine revolution speed at a time when the throttle is fully opened.

Further, the present invention can be applied to an engine driven power generator or the like which is mounted to a snow removing equipment or a power tiller in which a tilling rotary or an auger is driven by the engine, in the same manner, in addition to the engine driven power generator mounted to the lawn mower.

As is apparent from the description mentioned above, according to the inventions as recited in the claims, it is possible to change the electric motor that does double duty as the power generator so as to have a suitable output allocation in correspondence to the change of the engine speed, thereby stably driving the load.

In particular, according to the invention, it is possible to provide the region where the engine output is all supplied to the load, and it is possible to inhibit the electric motor from being frequently changed, owing to the provision of the region.

Further, according to the invention, it is possible to suitably apply the assisting power to the rapid increase of the engine load.

Further, according to the invention, it is possible to forecast the variation of the engine revolution speed so as to assist the power, based on the control amount of the governor due to the variation of the engine revolution speed.

What is claimed is:

1. An engine operated machine which is provided with an engine for driving a working machine driven at an approximately constant revolution speed, and an electric motor which does double duty as a power generator having an output shaft connected with an output shaft of the engine, comprising:
   a battery charged by an operation of the electric motor when the electric motor is operated as a power generator;
   a means for detecting a variation in the approximately constant revolution speed of the engine; and
   control circuit responsive to said detecting means for changing an operating mode of said machine between a charging mode where the battery is charged by an operation of the electric motor when the electric motor is operated as a power generator, and a driving mode where the power of the engine is increased by an operation of the battery as a power source.

2. An engine operated machine according to claim 1, wherein said control circuit stops the charging mode with continuing engine operation in a first region, in which the variation amount of the approximately constant engine revolution speed is more than a predetermined normal range, and executes the driving mode to assist the engine for driving a load in a second region, in which the variation amount of the approximately constant engine revolution speed is larger than that in the first region.

3. An engine operated machine according to claim 1 or 2, wherein said control circuit includes a feedback circuit including a revolution speed target of the electric motor higher than a revolution speed target of the engine in the driving mode, and wherein said control circuit further includes a current supply control means for supplying current to the electric motor for increasing an output torque of the electric motor, when the electric motor does not reach the engine revolution speed target within a predetermined time from a starting of the driving mode.

4. An engine operated machine according to claim 1, further comprising a governor controlling the engine in order to be operated at an approximately constant speed, and the variation of the approximately constant revolution speed is detected based on a variation of an opening degree of the governor.

5. An engine operated machine according to claim 2, further comprising a governor controlling the engine in order to be operated at an approximately constant speed, and the variation of the approximately constant revolution speed is detected based on a variation of an opening degree of the governor.

6. An engine operated machine according to claim 3, further comprising a governor controlling the engine in order to be operated at an approximately constant speed, and the variation of the approximately constant revolution speed is detected based on a variation of an opening degree of the governor.

* * * * *